US012038283B2

United States Patent
Tocchio et al.

(10) Patent No.: US 12,038,283 B2
(45) Date of Patent: Jul. 16, 2024

(54) FREQUENCY MODULATION MEMS TRIAXIAL GYROSCOPE

(71) Applicant: STMICROELECTRONICS S.R.L., Agrate Brianza (IT)

(72) Inventors: Alessandro Tocchio, Milan (IT); Luca Giuseppe Falorni, Limbiate (IT); Claudia Comi, Milan (IT); Valentina Zega, Porto Sant'Elpidio (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/821,724

(22) Filed: Aug. 23, 2022

(65) Prior Publication Data

US 2022/0404150 A1  Dec. 22, 2022

Related U.S. Application Data

(62) Division of application No. 16/697,092, filed on Nov. 26, 2019, now Pat. No. 11,448,507, which is a
(Continued)

(30) Foreign Application Priority Data

Oct. 24, 2016 (IT) .................. 102016000106928

(51) Int. Cl.
  *G01C 19/574* (2012.01)
  *G01C 19/5747* (2012.01)
  *G01C 19/5769* (2012.01)
(52) U.S. Cl.
  CPC ....... *G01C 19/5747* (2013.01); *G01C 19/574* (2013.01); *G01C 19/5769* (2013.01)
(58) Field of Classification Search
  CPC .................. G01C 19/574; G01C 19/5747
  See application file for complete search history.

(56) References Cited

U.S. PATENT DOCUMENTS

| 8,443,668 B2 | 5/2013 | Ohms et al. |
| 2010/0186505 A1 | 7/2010 | Sattler et al. |

(Continued)

FOREIGN PATENT DOCUMENTS

| CN | 101135563 A | 3/2008 |
| CN | 103221778 A | 7/2013 |

(Continued)

OTHER PUBLICATIONS

Akashi et al., "A 2-AXis Gyroscope With a Synchronously-Driven Dual Mass," 18th International Conference on Solid-State Sensors, Actuators and Microsystems, Anchorage, Alaska, Jun. 21-25, 2015, pp. 1243-1246.

(Continued)

*Primary Examiner* — Jill E Culler
*Assistant Examiner* — Ruben C Parco, Jr.
(74) *Attorney, Agent, or Firm* — Seed IP Law Group LLP (57) ABSTRACT

A frequency modulation MEMS triaxial gyroscope, having two mobile masses; a first and a second driving body coupled to the mobile masses through elastic elements rigid in a first direction and compliant in a second direction transverse to the first direction; and a third and a fourth driving body coupled to the mobile masses through elastic elements rigid in the second direction and compliant in the first direction. A first and a second driving element are coupled to the first and second driving bodies for causing the mobile masses to translate in the first direction in phase opposition. A third and a fourth driving element are coupled to the third and fourth driving bodies for causing the mobile masses to translate in the second direction and in phase opposition. An out-of-plane driving element is coupled to the first and second mobile masses for causing a translation in a third direction, in phase opposition. Movement-sensing (Continued)

electrodes generate frequency signals as a function of external angular velocities.

20 Claims, 6 Drawing Sheets

Related U.S. Application Data division of application No. 15/639,608, filed on Jun. 30, 2017, now Pat. No. 10,520,315.

(56) References Cited

U.S. PATENT DOCUMENTS

| | | |
|---|---|---|
| 2013/0192363 A1 | 8/2013 | Loreck et al. |
| 2014/0116135 A1 | 5/2014 | Cazzaniga et al. |
| 2014/0373628 A1 | 12/2014 | Balslink et al. |
| 2015/0330783 A1 | 11/2015 | Rocchi et al. |
| 2016/0003618 A1 | 1/2016 | Boser et al. |
| 2016/0069684 A1 | 3/2016 | Furuhata |

FOREIGN PATENT DOCUMENTS

| | | |
|---|---|---|
| CN | 204679079 U | 9/2015 |
| EP | 0664438 A1 | 7/1995 |
| EP | 2960625 A1 | 12/2015 |
| WO | WO 2014093727 A1 | 6/2014 |

OTHER PUBLICATIONS

Chiu et al., "Dual-axis tuning fork vibratory gyroscope with anti-phase mode vibration mechanism," *Microsyst Technol* 20:2173-2184, 2014.

Izyumin et al., "A 7PPM, 6°/HR Frequency-Output MEMS Gyroscope," IEEE 28th International Conference on Micro Electro Mechanical Systems (MEMS), Estoril, Portugal, Jan. 18-22, 2015, 5 pages.

Kline et al., "Quadrature FM Gyroscope," IEEE 26th International Conference on Micro Electro Mechanical Systems (MEMS), Taipei, Taiwan, Jan. 20-24, 2013, 5 pages.

FREQUENCY MODULATION MEMS TRIAXIAL GYROSCOPE

BACKGROUND

Technical Field

The present disclosure relates to a frequency modulation MEMS triaxial gyroscope.

Description of the Related Art

As is known, integrated gyroscopes of semiconductor material, obtained using MEMS (Micro-Electro-Mechanical Systems) technology, operate on the basis of the relative-acceleration theorem, exploiting the Coriolis acceleration. In particular, when a linear velocity is applied to a mobile mass (also called "proof mass") rotating at an approximately constant angular velocity, the mobile mass "feels" an apparent force, called Coriolis force, which determines a displacement thereof in a perpendicular direction to the linear velocity and to the rotation axis. By detecting this displacement in the direction of the apparent force, it is thus possible to indirectly measure the angular velocity.

Proposed MEMS gyroscopes work on the basis of two different principles: amplitude modulation and frequency modulation.

In amplitude-modulation gyroscopes, the amplitude of the displacement of the mobile mass is measured in a perpendicular direction to the driving direction, i.e., the direction of a pre-set linear velocity as imposed on the mobile mass. In particular, in this type of gyroscope, a mobile mass, rotating at an approximately constant velocity about a first Cartesian axis (for example, axis Z of a Cartesian reference system), is driven in a driving direction (for example, parallel to the axis X). In this situation, the Coriolis force causes a displacement in a sensing direction perpendicular to the previous two directions, for example here parallel to axis Y. The displacement in the sensing direction is proportional to the amplitude of the driving movement, which is known, and to the external angular velocity, which may thus be determined by measuring the displacement.

In frequency modulation gyroscopes of a QFM (quadrature frequency modulation) type and of an LFM (Lissajous frequency modulation) type the variation of frequency due to the Coriolis force is measured.

For a deeper understanding of the above, reference may be made to an ideal frequency modulation gyroscope of a QFM type for measuring the angular velocity component about the axis Z. In this case, a mobile inertial body of mass m is connected to the substrate by a spring system having stiffnesses $k_x$ and $k_y$ and allowing translation in the two directions X and Y and is driven in the two directions of the plane X and Y.

Assuming, for simplicity, the body as being point-like and neglecting any friction, the equations of motion in an inertial system, projected in the two directions, as a result of forces $F_x$ and $F_y$ acting, respectively, along the axis X and the axis Y, are:

$$m\ddot{x}+k_x x=F_x$$

$$m\ddot{y}+k_y y=F_y$$

The natural frequencies of oscillation $\omega_{ox}\omega_{ox}$ and $\omega_{oy}$ in the two directions are:

$$\omega_{ox}=\sqrt{\frac{k_x}{m}}$$

$$\omega_{oy}=\sqrt{\frac{k_y}{m}}$$

If $\omega_{ox}=\omega_{oy}$, the resonance motion is circular, as required by operation of a QFM type.

In presence of an external angular velocity $\Omega_z$ (which is assumed as varying in a negligible way within the measurement interval), the equations are modified as a result of the presence of the Coriolis force and become:

$$m\ddot{x}-2m\Omega_z\dot{y}+k_x x=F_x$$

$$m\ddot{y}+2m\Omega_z\dot{x}+k_y y=F_y \quad [1]$$

where the terms $2m\Omega_z\dot{y}$ and $2m\Omega_z\dot{x}$ are due to the Coriolis forces, and thus the motion changes. In particular, the frequencies become $\omega_x$ and $\omega_y$ and the solution in the ideal simplest case may be expressed in the form:

$$x=\bar{x}e^{i(\omega_x t+\psi_x)}$$

$$y=\bar{y}e^{i(\omega_y t+\psi_y)} \quad [2]$$

where $\psi_x$ and $\psi_y$ are the phases, and $\bar{x}$ and $\bar{y}$ are the amplitudes along the axis X and the axis Y, respectively.

With QFM type operation a phase shift of 90° is imposed between the two directions ($\omega_x t-\omega_y t+\psi_x-\psi_y=90°$) $\omega_x t+\psi_x-\psi_y=90°$) Substituting Eqs. [2] in Eq. [1] and considering the forcing term in quadrature with the displacement, the real part of the equations yields:

$$\omega_x^2+2\Omega_z\frac{\bar{y}\omega_y}{\bar{x}\omega_x}\omega_x-\omega_{ox}^2=0 \quad [3]$$

$$\omega_y^2+2\Omega_z\frac{\bar{x}\omega_x}{\bar{y}\omega_y}\omega_y-\omega_{oy}^2=0$$

Imposing the constraint $\bar{y}\omega_y=\bar{x}\omega_x$ (the quantities $\bar{y}\omega_y$ e $\bar{x}\omega_x$ and $\bar{x}\omega_x$ will be also denoted hereinafter as $v_{ya}$ $v_{ya}$ e $v_{xa}$ and $v_{xa}$, respectively, in so far as they represent the amplitudes of the oscillation velocities in the two directions) necessary for the QFM operation considered here, and solving Eqs. [3] as a function of $\omega_x$ and $\omega_y$, we obtain:

$$\omega_x-\omega_{ox}=-\Omega_z$$

$$\omega_y-\omega_{oy}=-\Omega_z$$

by neglecting less influent terms.

Frequency variation measurement consequently enables measurement of the angular velocity $\Omega_z$.

For a triaxial gyroscope (once again on the ideality hypotheses mentioned above), the inertial body is free to translate with respect to the substrate in the three directions. In presence of external angular velocities of components $\Omega_x$, $\Omega_y$, $\Omega_z$, the equations may be written as:

$$m\ddot{x}-2m\Omega_z\dot{y}+2m\Omega_y\dot{z}+k_x x=F_x$$

$$m\ddot{y}+2m\Omega_z\dot{x}-2m\Omega_x\dot{z}+k_y y=F_y$$

$$m\ddot{z}+2m\Omega_x\dot{y}-2m\Omega_y\dot{x}+k_z z=F_z \quad [4]$$

Imposing, during operation, the relation $\bar{y}\omega_y=v_{ya}=v_{xa}=$ $\bar{x}\omega_x=\bar{z}\omega_z=v_{az}$, we obtain the following expressions that enable measurement of the angular velocity:

$$\omega_x - \omega_{ox} = -\Omega_z \sin(\phi_{xy}) + \Omega_y \sin(\phi_{xz})$$

$$\omega_y - \omega_{oy} = -\Omega_z \sin(\phi_{xy}) + \Omega_x \sin(\phi_{yz})$$

$$\omega_z - \omega_{oz} = -\Omega_z \sin(\phi_{xz}) + \Omega_x \sin(\phi_{yz})$$

where $\phi_{xy}$, $\phi_{xz}$, and $\phi_{yz}$ are the phase differences between the displacements in parallel directions to the axes appearing in the subscripts, which may possibly be variable in time (LFM operation). The non-idealities of the system (dampings, mechanical couplings on the stiffnesses, variations in time of the amplitude of the displacements) may be included in the system with some degree of formal complication and will be included in the complete equations of the triaxial gyroscope described hereinafter.

A uniaxial gyroscope operating with frequency modulation is described, for example, in WO 2014/093727. The structure presented therein is very simple, comprising a single mobile mass, and enables non-differential measurement of the angular velocity acting only along one axis (axis Z).

Another known structure that exploits the principle of frequency modulation for measurement of the angular velocity is described in the paper "A 7 ppm, 6°/Hr frequency-output MEMS gyroscope" by Izyumin I., et al., MEMS 2015, Portugal, Jan. 18-22, 2015. In this case, reading the angular velocity acting along the axis Z is differential thanks to the introduction of four appropriately connected masses. This structure thus has large overall dimensions.

On the other hand, MEMS gyroscopes operating according to the frequency modulation principle have the advantage of a high stability, and their sensitivity is less subject to drifts in presence of temperature variations, stresses, or over time, as compared to amplitude-modulation (AM) gyroscopes.

BRIEF SUMMARY

According to the present disclosure, a frequency modulation MEMS triaxial gyroscope and the corresponding control method are provided. In particular, a MEMS gyroscope operating according to a frequency modulation principle that is able to detect angular velocities about different axes, with a simple and compact structure.

The present disclosure is also directed to MEMS triaxial gyroscope on a substrate having a first mobile and a second mobile mass suspended over the substrate and first, second, third, and fourth elastic elements. The gyroscope includes a first driving body coupled to the first mobile mass through the first elastic elements, a second driving body coupled to the second mobile mass through the second elastic elements, the first and second elastic elements being rigid in a first direction and compliant in a second direction transverse to the first direction, a third driving body coupled to the first mobile mass through the third elastic elements, and a fourth driving body coupled to the second mobile mass through the fourth elastic elements, the third and fourth elastic elements being rigid in the second direction and compliant in the first direction. The gyroscope also includes a first and a second driving element, coupled to the first and second driving bodies, respectively, and configured to cause the first and second mobile masses to translate in the first direction at a first frequency and in phase opposition, a third and a fourth driving element, coupled to the third and fourth driving bodies, respectively, and configured to cause the first and second mobile masses to translate in the second direction at a second frequency and in phase opposition, an out-of-plane driving element, coupled to the first and second mobile masses and configured to cause the first and second mobile masses to translate in a third direction, at a third frequency and in phase opposition, the third direction being transverse to the first and second directions, and movement sensing electrodes coupled to the first and second masses in the first, second, and third directions configured to sense movements due to external angular velocities, and generate, in use, signals at a frequency depending upon the external angular velocities.

BRIEF DESCRIPTION OF THE SEVERAL VIEWS OF THE DRAWINGS

For a better understanding of the present disclosure, a preferred embodiment thereof is now described, purely by way of non-limiting example, with reference to the attached drawings, wherein.

DETAILED DESCRIPTION

The triaxial gyroscope described herein is based on the solution of the classic equations of motion that describe a system with three degrees of freedom (triaxial gyroscope) via the method of phasors. These equations, for the ideal case, are represented by Eqs. [4].

Provided hereinafter are the equations of motion in Cartesian co-ordinates for a non-ideal system provided with dampings, stiffness couplings $k_{xy}$, $k_{xz}$ and $k_{yz}$ between the various directions, and non-point-like mass:

$$m\ddot{x} + b_{yx}\dot{x} + b_{xy}\dot{z} - 2m\alpha_y\Omega_z\dot{y} + 2m\alpha_y\Omega_z\dot{z} + k_x x + k_{xy} y + k_{xz} z - m\alpha_z^2\Omega_z^2 x + m\alpha_y^2\Omega_y^2 x + m\alpha_y\Omega_y\alpha_z\Omega_z z + m\alpha_x\Omega_x\alpha_z\Omega_z y - m\alpha_z\Omega_z y + m\alpha_y\Omega_y z - F_{xe}e^{i\phi_y} - iF_{xs}e^{j\phi_x} = 0,$$

$$m\ddot{y} + b_{yx}\dot{x} + b_{yz}\dot{z} - 2m\alpha_x\Omega_z\dot{z} + 2m\alpha_z\Omega_z\dot{x} + k_y y + k_{yx} x + k_{yz} z - m\alpha_z^2\Omega_z^2 y + m\alpha_x^2\Omega_x^2 y + m\alpha_x\Omega_x\alpha_y\Omega_y x + m\alpha_z\Omega_z\alpha_y\Omega_y z - m\alpha_z\Omega_z x + m\alpha_x\Omega_x z - F_{ye}e^{i\phi_y} - iF_{ys}e^{j\phi_x} = 0,$$

$$m\ddot{z} + b_{zy}\dot{z} + b_{zy}\dot{x} - 2m\alpha_y\Omega_z\dot{x} + 2m\alpha_x\Omega_z\dot{y} + k_z z + k_{zy} y + k_{zx} x - m\alpha_x^2\Omega_x^2 z + m\alpha_y^2\Omega_y^2 z + m\alpha_y\Omega_y\alpha_z\Omega_z y + m\alpha_x\Omega_x\alpha_z\Omega_z x - m\alpha_y\Omega_y x + m\alpha_x\Omega_x y - F_{ze}e^{i\phi_z} - iF_{zs}e^{j\phi_z} = 0,$$

On appropriate hypotheses (discussed in detail in the aforementioned international patent WO 2014/093727 for the one-axial case), by solving the previous equations of motion and imposing a time-dependent phase difference between the various axes (LFM), the following expressions are obtained:

$$\omega_x = \omega_{ox} - \alpha_z \Omega_z \frac{v_{ya}}{v_{xa}} \sin(\phi_{xy}) + \alpha_y \Omega_y \frac{v_{za}}{v_{xa}} \sin(\phi_{xz}),$$ [5]

$$\omega_y = \omega_{oy} - \alpha_z \Omega_z \frac{v_{xa}}{v_{ya}} \sin(\phi_{xy}) - \alpha_x \Omega_x \frac{v_{za}}{v_{ya}} \sin(\phi_{yz}),$$

$$\omega_z = \omega_{oz} + \alpha_y \Omega_y \frac{v_{xa}}{v_{za}} \sin(\phi_{xz}) - \alpha_x \Omega_x \frac{v_{ya}}{v_{za}} \sin(\phi_{yz}).$$

where $\omega_x$, $\omega_y$ and $\omega_z$ are the pulsations measured with respect to axes X, Y and Z, respectively, $\omega_{0x}$, $\omega_{0y}$, and $\omega_{0z}$ are the natural pulsations, in the absence of the Coriolis force, of the system with three degrees of freedom, $\alpha_x$, $\alpha_y$, and $\alpha_z$ are factors that depend upon coupling of the modal masses via the Coriolis force (angular gain) and that, in the ideal case of point-like mass, are equal to one, $v_{ya}$, $v_{xa}$, $v_{za}$ have the same meaning indicated above with reference to Eqs. [3], $\Omega_x$, $\Omega_y$, and $\Omega_z$ are the external angular velocities about the axes X, Y and Z to be determined, and $\phi_{xy}$, $\phi_{xz}$, and $\phi_{yz}$ are the phase differences between the displacements in the two directions indicated as subscripts.

The pulsations, and thus the frequencies of rotation about the three axes, depend upon the external angular velocities. Consequently, through a combined reading of the frequency variation on the three axes, it is easily possible to derive the value of the sought external angular velocity.

The present gyroscope has a structure with two (differential) mobile masses, where each mobile mass may perform pure translations along the three axes X, Y, and Z, uncoupled from one another, as explained hereinafter with reference to FIG. 1.

Figure 1:
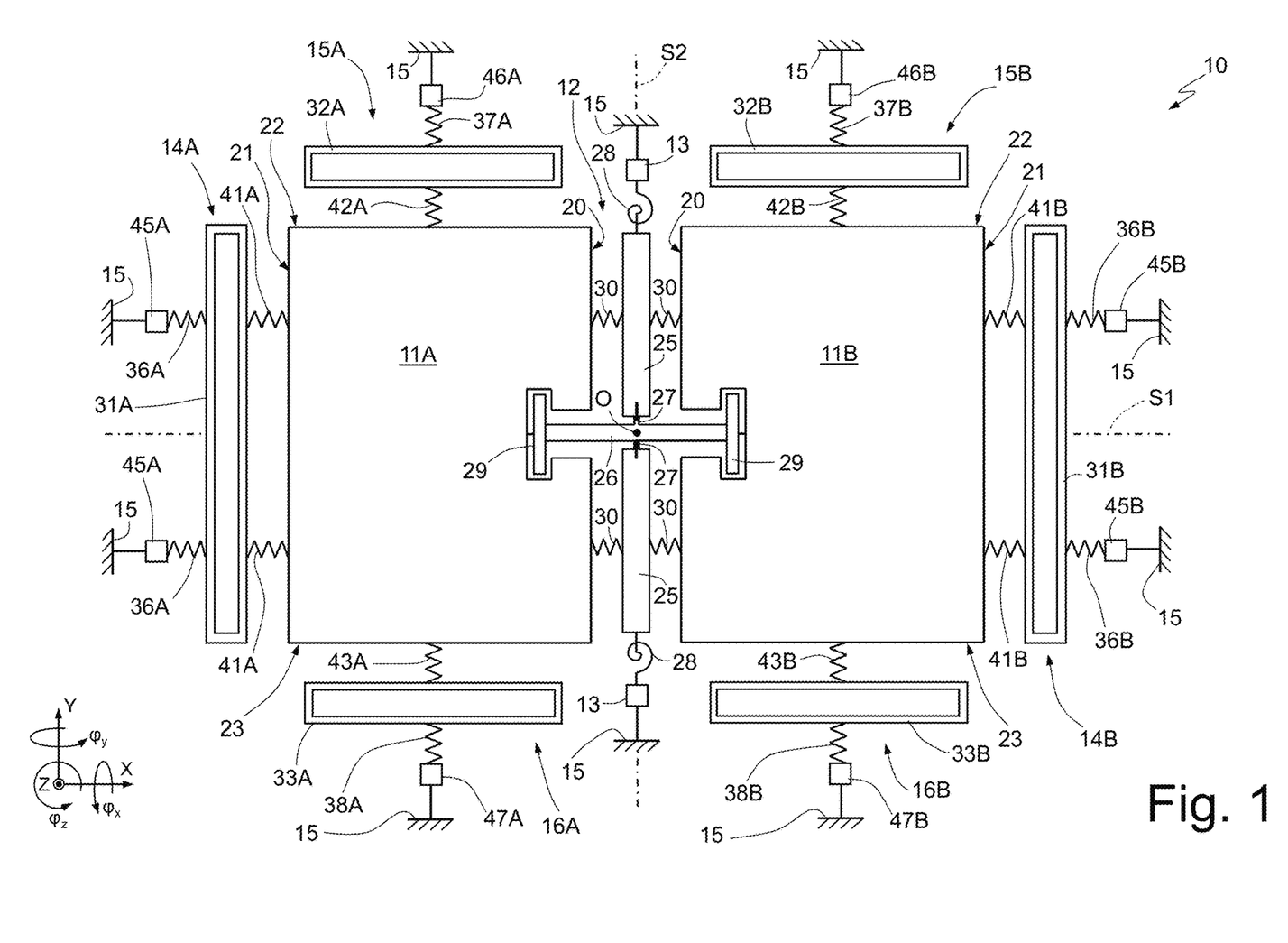
FIG. 1 is a schematic top plan view of a possible embodiment of the present gyroscope.

FIG. 1 shows a gyroscope 10 formed by a first mobile mass 11A and by a second mobile mass 11B.

The mobile masses 11A, 11B are symmetrical with respect to a first and to a second symmetry axis S1, S2, perpendicular to one another and parallel to axes X and Y of a Cartesian reference system XYZ. In the gyroscope 10, the mobile masses 11A, 11B may be translated parallel to the first and to the second symmetry axis S1, S2, i.e., to the Cartesian axes X, Y, as well as parallel to a vertical axis O, parallel to axis Z of the Cartesian reference system XYZ and passing through the centroid of the gyroscope 10. Further, in use, the gyroscope 10 is rotatable about Cartesian axes X, Y, and Z with an angular velocity to be determined.

The mobile masses 11A, 11B are coupled together through a central bridge structure 12. Further, each mobile mass 11A, 11B is suspended over a substrate 15 (represented only schematically) through anchoring structures 13, 45A, 45B, 46A, 46B, 47A, 47B and three pairs of coupling/driving structures 14A, 14B, 15A, 15B, 16A, 16B, which enable a three-dimensional translational movement, independent in the three directions, of the mobile masses 11A, 11B, as described in detail hereinafter.

The mobile masses 11A, 11B, the central bridge structure 12, and the coupling and driving structures 14A, 14B, 15A, 15B, 16A, 16B are formed in a same structural layer, for example of polycrystalline silicon, via surface micromachining techniques. For example, they are obtained by removing an underlying sacrificial layer.

In detail, each mobile mass 11A, 11B has a generally rectangular shape, of a thickness (in a direction parallel to axis Z) much smaller than the other dimensions, in a per se known manner. Each mobile mass 11A, 11B thus has (in top plan view) a first side 20 parallel to axis Y coupled to the central bridge structure 12 (thus, also referred to hereinafter as inner side), a second side 21, opposite to the first side 20, likewise parallel to axis Y, arranged facing outwards (thus, also referred to hereinafter as outer side), and a third side 22 and a fourth side 23 (also referred to hereinafter as top side and bottom side) which are parallel, in top view, to axis X.

The second, third, and fourth sides 21-23 of the mobile masses 11A, 11B are each coupled to a respective coupling and driving structure 14A, 14B, 15A, 15B, 16A, 16B.

In the embodiment shown, the central bridge structure 12 is formed by a cross-shaped joint comprising a pair of first bars 25, a second bar 26, and first, second, third, and fourth central springs 27-30.

The first bars 25 extend parallel to axis Y as a prosecution of one another and have a longitudinal axis coinciding with the second symmetry axis S2. The first bars 25 are connected together at an inner end through the first central springs 27 and through the second bar 26 and are anchored to the substrate 15 at an outer end through the second central springs 28 and the anchoring structures 13.

The first central springs 27 connect the inner end of the first bars 25 to a central portion of the second bar 26 and are substantially flexure springs that enable rotation of the second bar 26 with respect to the first bars 25 about the vertical axis O of the gyroscope 10, but are substantially rigid in the other directions. They thus form articulated joints of a hinge type, as discussed in detail hereinafter.

The second central springs 28 are torsion springs, which enable rotation of the first bars 25 about the second symmetry axis S2. They may further enable a minor rotation of the first bars 25 also about vertical axis O concordant, but in general not rigid with respect to, the second bar 26, as explained in greater detail hereinafter.

Figure 2:
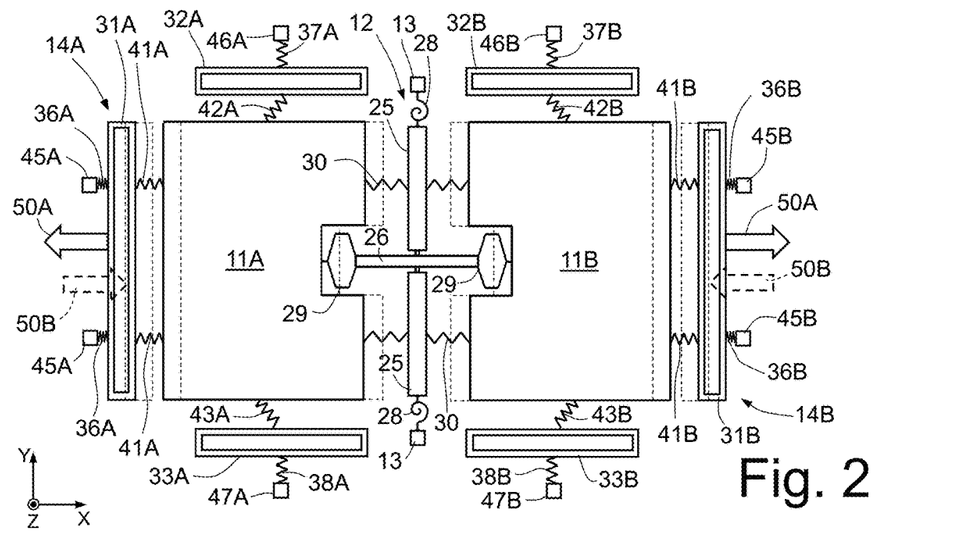
FIG. 2 shows the deformations undergone by the gyroscope of FIG. 1, as a result of driving in a first direction.

The third central springs 29 are each arranged between a respective end of the second bar 26 and a respective mobile mass 11A, 11B. The central springs 29 are deformable in a direction parallel to axis X (as shown in FIG. 2) so as to uncouple the mobile masses 11A, 11B from the second bar 26 (and thus from the first bars 25) in a direction parallel to axis X. The third central springs 29 also enable a rotation of the second bar 26 with respect to the mobile masses 11A, 11B, as described hereinafter with reference to FIG. 3.

The fourth central springs 30 extend between the first bars 25 and the suspended masses 11A, 11B and are compliant in all three movement directions of the mobile masses 11A, 11B, parallel to the Cartesian axes X, Y, and Z.

The coupling/driving structures 14A, 14B, 15A, 15B, 16A, 16B are similar to each other and have the task of driving the mobile masses 11A, 11B in a respective direction (parallel to axis X or Y), enabling also displacement thereof parallel to axis Z.

Each coupling/driving structure 14A, 14B, 15A, 15B, 16A, 16B comprises a respective frame element 31A, 31B, 32A, 32B, 33A, 33B, at least one anchoring spring 36A, 36B, 37A, 37B, 38A, 38B, and at least one decoupling spring 41A, 41B, 42A, 42B, 43A, 43B.

Due to the symmetry of the structure of the gyroscope 10 with respect to the symmetry axis S2, these structures are identified by a same number and by the letter A or B, according to whether they are coupled to the first mobile mass 11A or to the second mobile mass 11B. Further, hereinafter, where the letters A and B are not indicated, it is understood that what is described refers to both the coupling/driving structures and to both the elements thereof arranged symmetrically with respect to the second symmetry axis.

In detail, the frame elements 31-33 (referred to also as X frame elements 31, first Y frame elements 32, and second Y frame elements 33) are here formed by rectangular frames, extending parallel to the Cartesian axes X and Y and coupled to respective X coupling/driving structures 14, first Y coupling/driving structures 15 and second Y coupling/driving structures 16.

The X coupling/driving structure 14A, 14B is arranged between the outer side 21 of the respective mobile mass 11A, 11B and second anchoring structures 45A, 45B and is coupled to respective X anchoring springs 36 and respective X decoupling springs 41. Each anchoring spring 36A, 36B of the X coupling/driving structures 14A, 14B, arranged between the respective second anchoring structures 45A, 45B and the respective X frame element 31A, 31B, only enables translation of the latter parallel to axis X. Each X decoupling spring 41A, 41B, arranged between the respective X frame element 31A, 31B and the respective mobile mass 11A, 11B, enables movements parallel to axes Y and Z of the respective mobile mass 11A, 11B with respect to its own X frame element 31A, 31B, but is rigid parallel to axis X so as to transmit the movements along this axis, as explained hereinafter with reference to FIG. 2.

Likewise, the first Y coupling/driving structure 15A, 15B is arranged between the top side 22 of each mobile mass 11A, 11B and a third anchoring structure 46A, 46B and is coupled to respective Y anchoring springs 37 and respective Y decoupling springs 42. The second Y coupling/driving structure 16A, 16B is arranged between the bottom side 23 of each mobile mass 11A, 11B and a fourth anchoring structure 47A, 47B and is coupled to respective second Y anchoring springs 38 and respective second Y decoupling springs 43. Each anchoring spring 37A, 37B, 38A, 38B of the second and third Y coupling/driving structures 15A, 15B, 16A, 16B, arranged between the respective anchoring structure 46A, 46B, 47A, 47B and the respective Y frame element 32A, 32B, 33A, 33B, enables only translation of the latter parallel to axis Y. Each Y decoupling spring 42A, 42B, 43A, 43B, arranged between the respective frame element 32A, 32B, 33A, 33B and the respective mobile mass 11A, 11B, enables movements of the latter with respect to its own Y frame element 32A, 32B, 33A, 33B parallel to axes X and Z, but is rigid in a direction parallel to axis Y so as to transmit movements in this direction, as explained hereinafter with reference to FIG. 3.

Hereinafter, the movements of the mobile masses 11A, 11B are described separately in the three directions parallel to axes X, Y, and Z (also referred to below as X, Y, and Z movements). However, during operation as triaxial gyroscope, normally the gyroscope is driven in all three directions simultaneously, and the movements described below add up. In particular, the frame elements 31-33 and the mobile masses 11A, 11B may be driven simultaneously (through the respective driving electrodes described below) with the same amplitude of velocity and appropriate phase to obtain an overall movement of the mobile masses 11A, 11B of a three-dimensional type with three-dimensional Lissajous trajectories in the LFM case.

In a way not shown in FIG. 1, the X coupling/driving structures 14A, 14B have first driving units to translate the mobile masses 11A, 11B parallel to axis X, in phase opposition, as shown in FIG. 2 (X movement). Here, the mobile masses 11A, 11B and the X frame elements 31A, 31B are shown in a first position with a solid line and in a second position with a dashed line. In particular, the X movement is driven (in the opposite direction) by the X frame elements 31A, 31B through the X decoupling springs 41A, 41B, which are rigid in a direction parallel to axis X. Thus, as shown by the pair of arrows 50A, 50B in FIG. 2 (whereof a first arrow 50A indicates the X movement in a first step, and a second arrow 50B indicates the movement in the same direction X in a second step), the mobile masses 11A, 11B are driven periodically according to the differential movement parallel to axis X, which, in the absence of an external angular velocity, is at the frequency $\omega_{0x}$, always together, moving away from or towards the central bridge structure 12. During the X movement, the X anchoring springs 36A, 36B of the X coupling/driving structures 14A, 14B are compressed and the third central springs 29 expand (and vice versa) on the basis of the driving phase.

As indicated, during the X movement, since the X decoupling springs 41A, 41B of the X coupling/driving structures 14A, 14B are rigid in the direction parallel to the axis X, they transmit the driving movement from the X frame elements 31A, 31B to the respective mobile masses 11A, 11B. Further, the Y decoupling springs 42, 43 of the Y coupling/driving structures 15, 16 undergo deformation, decoupling the mobile masses 11A, 11B from the Y frame elements 32, 33. The third and fourth central springs 29, 30 further decouple the mobile masses 11A, 11B from the first bars 25 in a direction parallel to the axis X.

Figure 3:
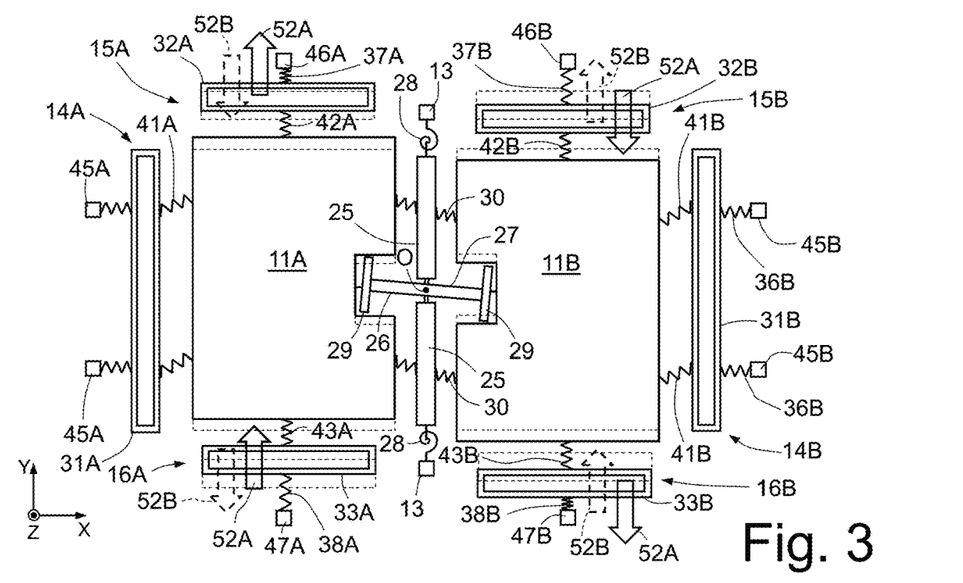
FIG. 3 shows the deformations undergone by the gyroscope of FIG. 1, as a result of driving in a second direction.

Likewise, in a way not shown in FIG. 1, the Y coupling/driving structures 15, 16 are provided with second driving units such as to govern movement of the mobile masses 11A, 11B in phase opposition, parallel to the axis Y (Y movement), as shown in FIG. 3. Here, the mobile masses 11A, 11B and the Y frame elements 32A, 32B, 33A, 33B are shown in a first position with a solid line and in a second position with a dashed line. In particular, the Y movement is driven (in opposite directions) by the Y frame elements 32A, 32B, 33A, 33B through the Y decoupling springs 42A, 42B, 43A, 43B, rigid parallel to axis Y. Thus, as shown by the arrows 52A, 52B in FIG. 3 (where a first arrow 52A indicates the Y movement in a first step, and a second arrow 52B indicates the Y movement in a second step), the mobile masses 11A, 11B are driven in an opposite way, one upwards and the other downwards and vice versa according to the movement that, in the absence of an external angular velocity, has a frequency $\omega_{0y}$.

During the Y movement, the Y anchoring springs 37, 38 of the Y coupling/driving structures 15, 16 compress and expand on the basis of the driving phase, whereas the Y decoupling springs 42, 43, rigid parallel to axis Y, transmit the driving movement from the Y frame elements 32, 33 to the respective mobile masses 11A, 11B. In this driving mode, the X decoupling springs 41 of the X coupling/driving structures 14, as well as the central springs 27, 29 and 30, undergo deformation. Further, as shown in FIG. 3, the second bar 26 turns about the vertical axis O because of the first central springs 27, which in practice form articulated joints. As indicated above, in this step, also the first bars 25 may turn about the vertical axis O, even though to a lesser extent than the second bar 26. Alternatively, the first bars 25 and the second bar 26 could form a rigid body, rotating together.

Figure 4:
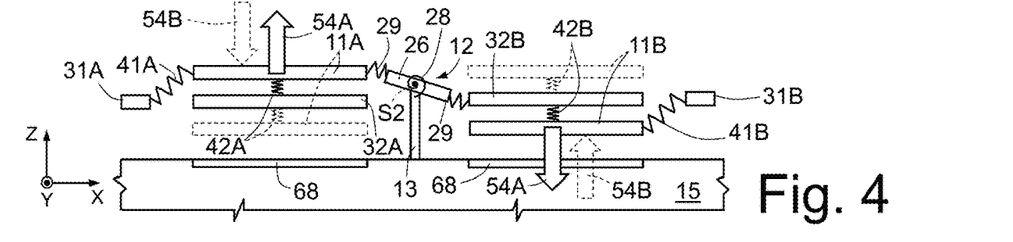
FIG. 4 is a schematic representation in side view of the gyroscope of FIG. 1, as a result of driving in a third direction.

The mobile masses 11A, 11B of the gyroscope 10 are further able to translate parallel to axis Z and uncoupled with respect to the frame elements 31-33 (Z movement). In detail, as shown in FIG. 4, Z driving electrodes 68 are provided underneath the mobile masses 11A so as to drive movement thereof in phase opposition, parallel to the axis Z. In the example shown in FIG. 4, the Z driving electrodes 68 are formed by doped regions in the substrate 15, but other solutions are possible.

In use, the Z driving electrodes 68 are biased so as to control movement of the mobile masses 11A, 11B in phase opposition, as shown by arrows 54A, 54B (where a first arrow 54A indicates the movement in a first step, and a second arrow 54B indicates the movement in a second step of the Z movement). In practice, the mobile masses 11A, 11B are driven one away from and the other towards the substrate 15, and vice versa, according to the movement that, in the absence of an external angular velocity, has a frequency co oz. During this movement, the decoupling springs 41-43 (whereof FIG. 4 only shows the decoupling springs 41A, 41B, 42A, 42B), the second, third, and fourth central springs 28-30 of the central bridge 12 undergo deformation, decoupling the mobile masses 11A, 11B from the frame elements 31-33, which are thus fixed along Z. Instead, the first and second bars 25, 26 may rotate about the second symmetry axis S2.

In one embodiment, during movement of the mobile masses 11A, 11B, the first springs 27 act so as to prevent onset of a spurious vibration mode at about the operating frequencies. In fact, without the first springs 27, the mobile masses 11A, 11B would be free to translate upwards (direction Y) indifferently in phase (non-desired movement for the gyroscope) or in phase opposition (desired movement for the gyroscope), causing onset of problems in driving the gyroscope 10. Further, due to the presence of the first springs 27, the displacement of the first bars 25 during Y movement of the mobile masses 11 decreases drastically (practically going to zero). Consequently, with the structure shown in FIG. 5, the modal mass involved in the Y movement is not modified, and thus there are no undesired reductions of the mass coupling factor via the Coriolis force ("angular gain") and thus of sensitivity of the gyroscope 10. In this way, the mobile masses 11A, 11B have three degrees of freedom (3 d.o.f), uncoupled from each other, and the frame elements 31-33 have just one degree of freedom (1 d.o.f.). Further, the first and second bars 25, 26 may perform a main movement according to a first degree of freedom (rotation about the second symmetry axis S2), and the second bar 26 also has a second degree of freedom (rotation about the vertical axis O).

In the gyroscope 10, when the mobile masses 11A, 11B rotate at an angular velocity that is constant or variable in a negligible way in the measurement interval, about at least one of the three axes X, Y, and Z and are driven according to the three-dimensional trajectories indicated above, they undergo a frequency variation as a result of the Coriolis forces acting along the Cartesian axes X, Y, and/or Z. As discussed and shown by Eqs. [5], this frequency variation may be detected via sensing electrodes X, Y, and Z, which generate sensing signals with variable frequency, due to the capacitive variations associated to the three-dimensional motion of the mobile masses 11A, 11B. These sensing signals may be supplied to a processing unit (not shown), generally external to the die integrating the gyroscope 10 to calculate the external angular velocities.

The described gyroscope 10 consequently has two mobile masses 11A, 11B that may be controlled independently in the three directions X, Y, and Z, thus providing a triaxial gyroscope 10.

Further, the same structure may be exploited for providing an amplitude modulated gyroscope driven, for example, along axis X through the first frame elements 31 (movement according to the arrows 50A, 50B in FIG. 2) and sensing along axis Y (movement according to the arrows 52A, 52B in FIG. 3, yaw mode) or sensing along axis Z (movement according to the arrows 54A, 54B in FIG. 4, roll mode).

Figure 5:
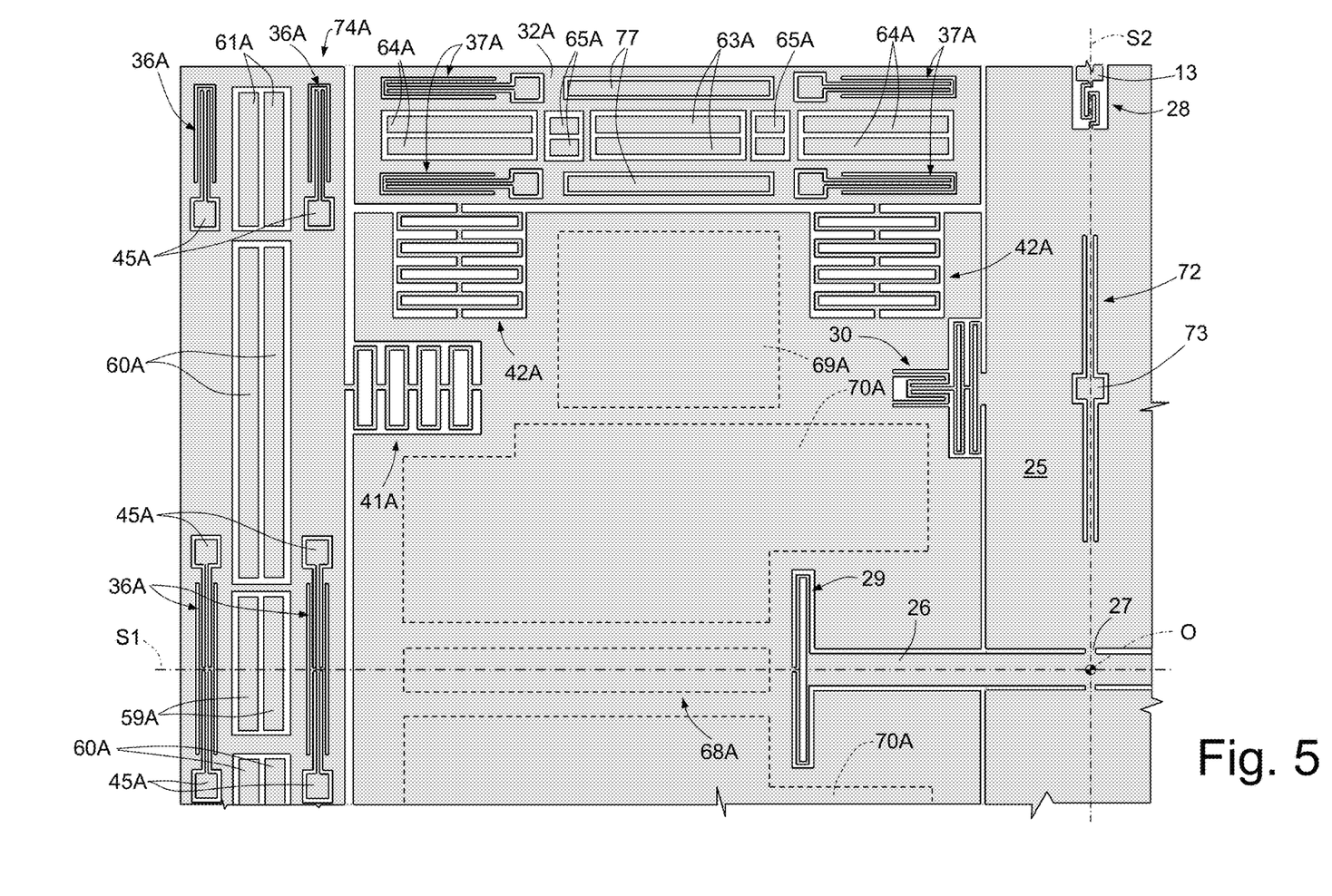
FIG. 5 is a top plan view of a fourth possible implementation of the gyroscope of FIG. 1.

The gyroscope 10 may be implemented as shown in FIG. 5, as regards one quarter of the structure, by virtue of its symmetry with respect to the first and second symmetry axes S1, S2. In particular, FIG. 5 shows a possible implementation of the driving electrodes and of the X and Y sensing electrodes, in addition to tuning electrodes, as described hereinafter.

Here, the frame elements 31-33 are formed by generally rectangular bodies housing openings accommodating driving electrodes, sensing electrodes, and tuning electrodes.

In detail, the X frame elements 31A (and 31B, not visible) surround X driving electrodes (whereof only references 59A are shown), X sensing electrodes (whereof only references 60A are shown), and X tuning electrodes (whereof only references 61A are shown).

Likewise, Y driving electrodes (whereof only references 63A are shown), Y sensing electrodes (whereof only references 64A are shown), and Y tuning electrodes (whereof only references 65A are shown) extend within the Y frame elements 32A (and 32B, 33A and 33B, not visible)

The X and Y driving electrodes 59, 63 and the X and Y sensing electrodes 60, 64 are formed, in a known way, as projections of semiconductor material, extending from the substrate 15 (not visible in FIG. 5) within the respective X and Y frame elements 31, 32 (and 33, not visible) and thus capacitively coupled to the internal vertical walls of the X and Y frame elements 31, 32-33. They thus form parallel plate electrodes allowing an in-plane motion of the gyroscope 10.

FIG. 5 also shows stopper structures 77, formed in corresponding openings of the X frame elements 31.

Figure 6:
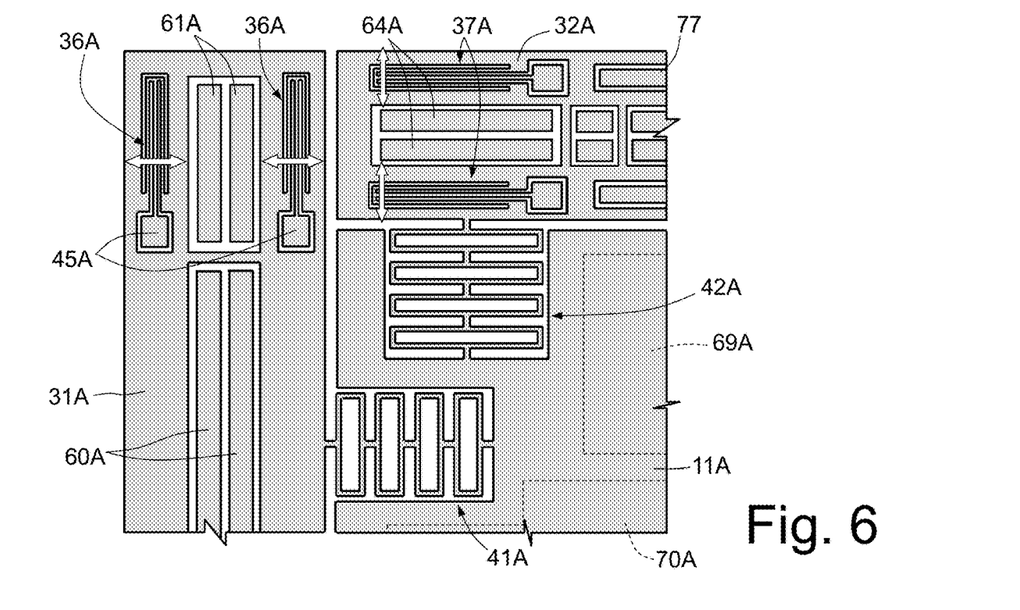
FIGS. 6-8 show enlarged details of the structure of FIG. 5.
Figure 7:
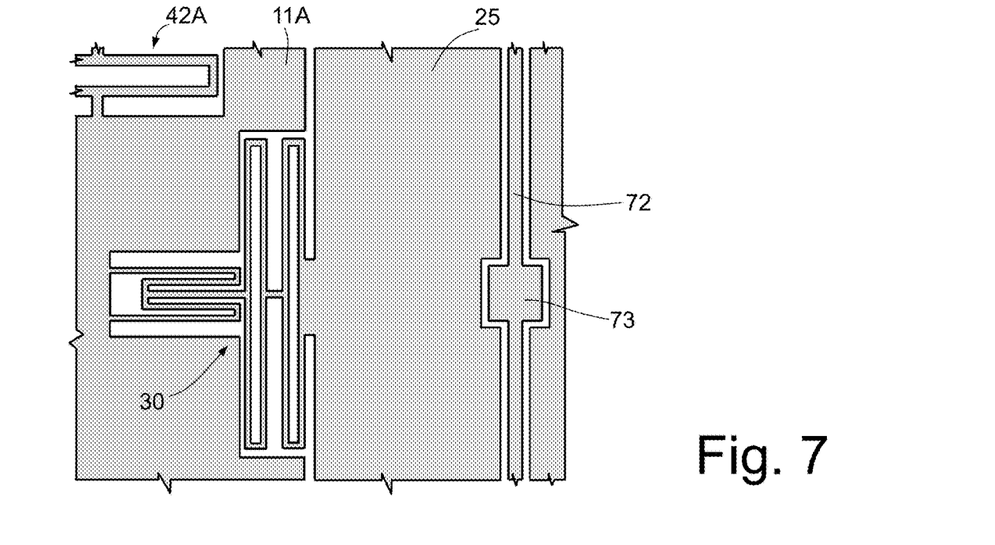
Figure 8:
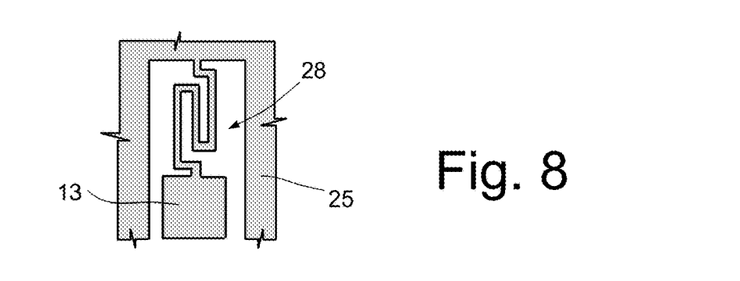

FIG. 5 shows possible implementations of the first, second, third, and fourth central springs 27-30, of the anchoring springs 36-38, and of the decoupling springs 41-43. These springs are represented at an enlarged scale also in FIGS. 6-7 allowing appreciation of the various configurations that determine their elastic properties selectively in the X, Y, and Z movement directions of the mobile masses 11A, 11B. In particular, the second central springs 28 (whereof FIG. 5 only shows the one close to the first Y frame elements 32A, 32B and FIG. 8 only shows the one close to the second Y frame elements 33A, 33B) are symmetrical only with respect to the first symmetry axis S1, even though it is possible to obtain a symmetrical configuration also with respect to the second symmetry axis S2. In general, even though the structure has a high symmetry, minor deviations from complete symmetry are possible. Further, in the embodiment of FIG. 5, further central springs 72 extend within the first bars 25, parallel to the second symmetry axis S2, and couple the first bars 25 to further anchoring elements 73. The further central springs 72 also enable the movements described above of the first bars 25.

FIG. 5 further shows the Z driving electrodes 68 with dashed line. In addition, FIG. 5 also shows Z sensing electrodes 69 and Z tuning electrodes 70 with dashed line. All the Z electrodes 68, 69 and 70 are here made as shown in FIG. 4, integrated in the substrate 15 and formed by appropriately insulated doped areas.

It should be noted that, in the embodiment of the gyroscope shown in FIG. 5, the dimensions of the electrodes 59-61, 63-65, and 68-70 are purely indicative, and their effective size depends upon the desired performance. Further, the X and Y tuning electrodes 61, 65 could be omitted so as to leave more space for the sensing electrodes and thus improve the performance of the gyroscope 10 as regards noise.

In this way, the present gyroscope is able to detect rotational velocities about three axes using only two mobile masses. The described gyroscope thus has a reduced bulk and lower costs.

The present gyroscope is particularly reliable since it is potentially able to reject external accelerations in all directions with just two mobile masses.

Given its differential structure, the present gyroscope reduces the effects of thermal stresses and increases the linear range of sensitivity.

The present gyroscope may be obtained by surface processing techniques using a single structural layer of a uniform thickness (in a direction parallel to axis Z). Its production is thus very simple and compatible with current surface micromachining processes. The present gyroscope thus presents a high reliability and yield.

It is able to work both as triaxial gyroscope and as biaxial gyroscope (pitch-roll, yaw-roll, yaw-pitch), allowing good decoupling between the modes.

Figure 9:
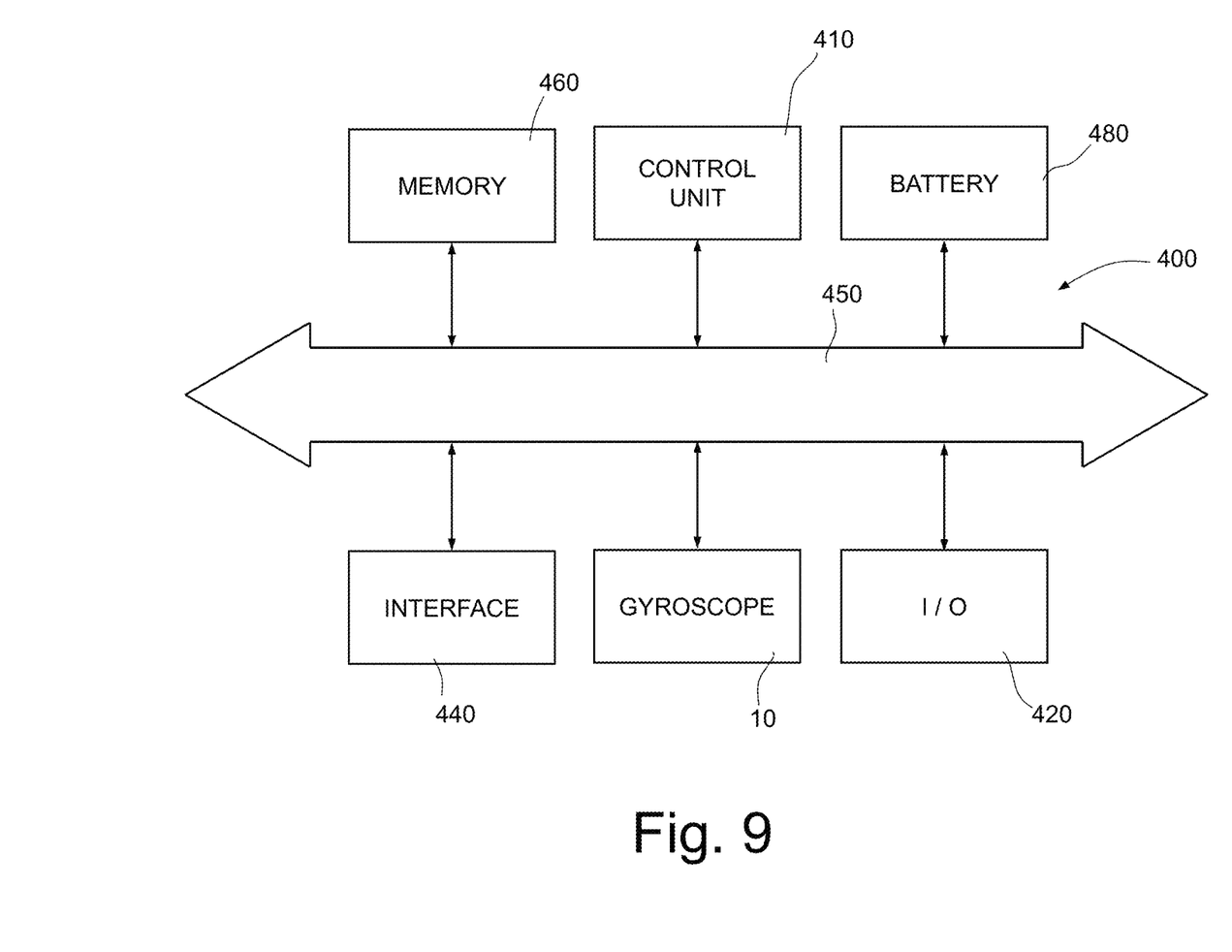
FIG. 9 shows a simplified block diagram of an electronic apparatus incorporating the gyroscope of FIG. 1.

FIG. 9 illustrates a portion of an electronic system 400 that incorporates the gyroscope 10 and may be used in apparatuses such as a palmtop computer (personal digital assistant, PDA), a laptop or portable computer, possibly with wireless capacity, a cellphone, a messaging device, a digital music player, a digital camera, or other apparatuses designed to process, store, transmit, or receive information. For example, the gyroscope 10 may be used in a digital camera to detect movements and implement an image stabilization. In a possible embodiment, the gyroscope 10 is included in a motion-activated user interface for computers or consoles for videogames. In a further embodiment, the gyroscope 10 is incorporated in a satellite-navigation device and is used for temporary tracking of position in the case of loss of the satellite-positioning signal.

The electronic system 400 of FIG. 9 comprises a control unit 410, an input/output (I/O) unit 420 (for example, a keypad or a display), the gyroscope 10, a wireless interface 440, and a memory 460, of a volatile or non-volatile type, coupled together through a bus 450. Alternatively, the memory 460 may be internal to the control unit 410 and store the parameters and quantities for operating the gyroscope 10, such as the driving voltages. In one embodiment, a battery 480 may be used for supplying the system 400. The electronic system 400 may, however, comprise only some of the units shown in FIG. 9.

The control unit 410 may comprise, for example, one or more microprocessors, microcontrollers, and the like. The I/O unit 420 may be used for generating a message. The electronic system 400 may use the wireless interface 440 to transmit and receive messages to and from a wireless communication network (not shown) with a radiofrequency (RF) signal. Examples of wireless interface may comprise an antenna, a wireless transceiver, such as a dipole antenna, even though the scope of the present disclosure is not limited thereto. Further, the I/O unit 420 may supply a voltage representing the stored information either as a digital output (if digital information has been stored) or as an analog output (if analog information has been stored).

Finally, it is clear that modifications and variations may be made to the gyroscope described and illustrated herein, without thereby departing from the scope of the present disclosure, as defined in the attached claims.

Figure 10:
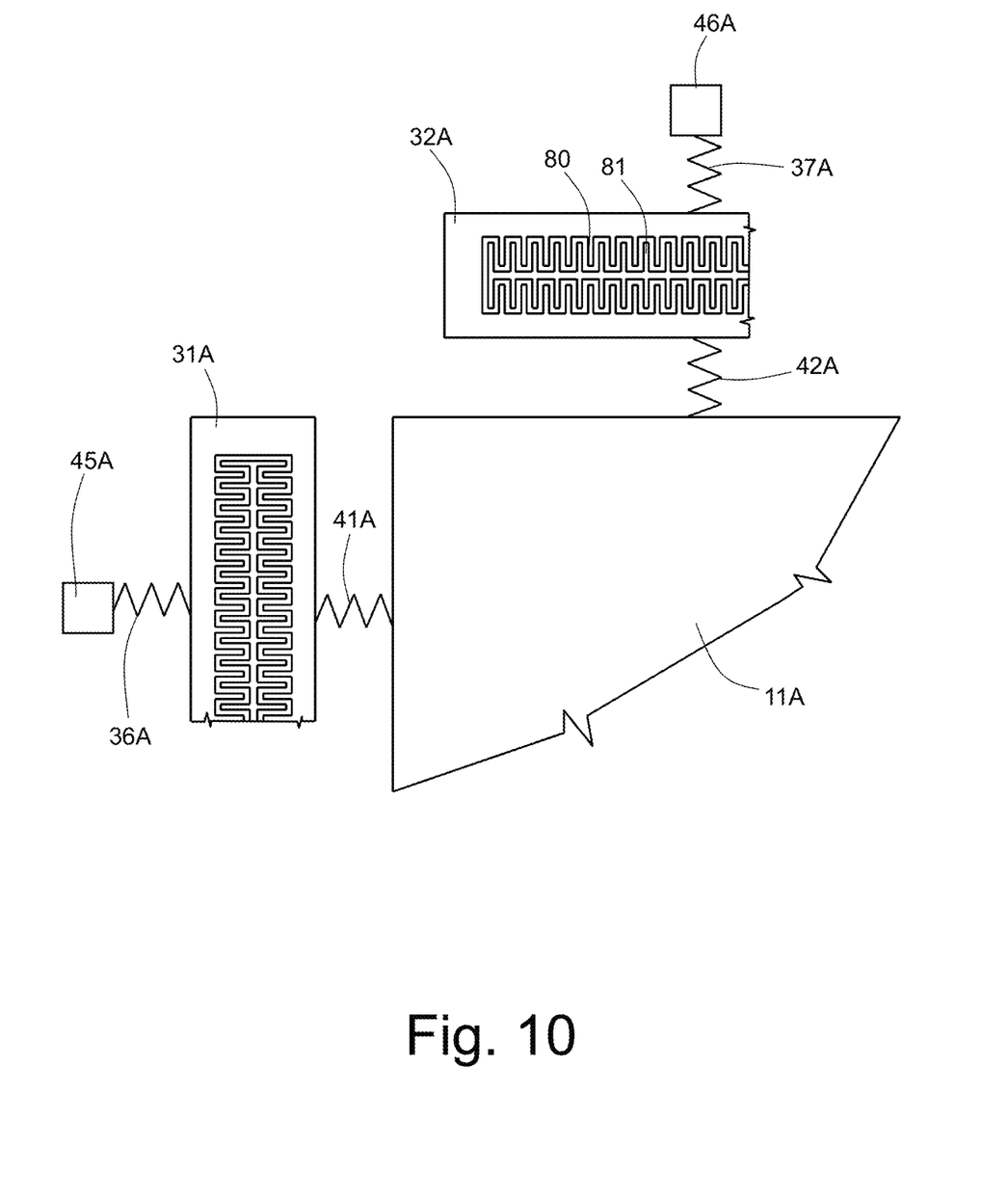
FIG. 10 is a top plan view of a portion of a different implementation of the gyroscope of FIG. 1.

For example, the X and Y driving electrodes 59, 63 and the X and Y sensing electrodes 60, 64 may be formed differently from FIG. 5. In particular, instead of being formed as parallel-plate electrodes, they may be comb-fingered electrodes, as shown in FIG. 10 as regards half of the Y frame element 32A and of the X frame element 31A. In particular, with this configuration, the X and Y frame elements 31, 32 have a plurality of mobile fingers 80 extending from the long sides of the X and Y frame elements 31, 32, parallel to each other and directed inwards, comb-fingered with fixed fingers 81, formed within the X and Y frame elements 31, 32. The fixed fingers 81 are arranged parallel to each other and to the mobile fingers and are anchored to the substrate (not shown), analogously to known comb-fingered structures.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
controlling a microelectromechanical triaxial gyroscope by:
moving a first driving element and a first mobile mass at a first frequency, rigid with each other, in a first direction by controlling the first driving element that is coupled to the first mobile mass suspended over a substrate;
moving a second driving element and a second mobile mass at the first frequency, rigid with each other, in the first direction and in phase opposition with respect to the first driving element and the first mobile mass by controlling the second driving element that is coupled to the second mobile mass suspended over the substrate;
moving a third driving element and the first mobile mass at a second frequency, rigid with each other, in a second direction, transverse to the first direction by controlling the third driving element that is coupled to the first mobile mass; and
moving a fourth driving element and the second mobile mass at the second frequency, rigid with each other, in the second direction and in phase opposition with respect to the third driving element and the first mobile mass by controlling the fourth driving element that is coupled to the second mobile mass;
moving the first and second mobile masses in a third direction at a third frequency and in phase opposition, the third direction being transverse to the first and second directions by controlling a fifth driving element that is coupled to the second mobile mass; and
detecting signals at variable frequency due to external angular velocities causing movements of the first and second mobile masses in the first, second, and third directions, wherein a central bridge is directly coupled between the first mobile mass and the second mobile mass.

2. The method according to claim 1 wherein the first, second, third, and fourth driving elements generate three-dimensional translations of the first and second suspended masses according to three-dimensional trajectories in opposite directions.

3. The method of claim 1, wherein the central bridge comprises a first bar in the second direction and a second bar in the first direction.

4. The method of claim 3, wherein the central bridge is coupled to the substrate.

5. The method of claim 1, wherein the fifth driving element includes:
a first electrode in the substrate, the first electrode coupled to the first mobile mass; and
a second electrode in the substrate, the second electrode driving the second mobile mass.

6. The method of claim 1, wherein the first driving element is fixed with respect to the first mobile mass and the second driving element is fixed with respect to the second mobile mass.

7. A method, comprising:
controlling a microelectromechanical triaxial gyroscope by:
moving a first driving element that is coupled to a first mobile mass at a first frequency, in a first direction by controlling the first driving element;
moving a second driving element that is coupled to a second mobile mass at the first frequency, in the first direction and in phase opposition with respect to the first driving element and the first mobile mass by controlling the second driving element;
moving a third driving element coupled to the first mobile mass at a second frequency, in a second direction, transverse to the first direction by controlling the third driving element; and
moving a fourth driving element coupled to the second mobile mass at the second frequency, in the second direction and in phase opposition with respect to the third driving element and the first mobile mass by controlling the fourth driving element;
moving the first and second mobile masses in a third direction at a third frequency and in phase opposition, the third direction being transverse to the first and second directions by controlling a fifth driving element that is coupled to the second mobile mass; and
detecting signals at variable frequencies due to external angular velocities causing movements of the first and second mobile masses in the first, second, and third directions, wherein a central bridge is directly coupled between the first mobile mass and the second mobile mass.

8. The method according to claim 7 wherein the first, second, third, and fourth driving elements generate three-dimensional translations of the first and second mobile masses according to three-dimensional trajectories in opposite directions.

9. The method of claim 7 wherein the first driving element is fixed with respect to the first mobile mass and the second driving element is fixed with respect to the second mobile mass.

10. The method of claim 9 wherein the third driving element is fixed with respect to the first mobile mass.

11. The method of claim 7 wherein the central bridge bride is coupled to a substrate.

12. The method of claim 7, wherein the central bridge comprises a first bar in the second direction and a second bar in the first direction.

13. The method of claim 12, wherein the first driving element is fixed with respect to the first mobile mass and the second driving element is fixed with respect to the second mobile mass.

14. The method of claim 12, wherein the first and second bars having a first degree of freedom, and the second bar having a second degree of freedom.

15. The method of claim 7, wherein moving the first and second mobile masses in a third direction further includes:
controlling a sixth driving element in a substrate that is coupled to the first mobile mass.

16. A method, comprising:
controlling a microelectromechanical triaxial gyroscope by:
controlling a first driving element at a first frequency, in a first direction;
controlling a second driving element at the first frequency, in the first direction and in phase opposition with respect to the first driving element;
controlling a third driving element at a second frequency, in a second direction, transverse to the first direction; and
controlling a fourth driving element at the second frequency, in the second direction and in phase opposition with respect to the third driving element;
moving a first mobile mass and a second mobile mass in a third direction at a third frequency and in phase opposition, the third direction being transverse to the first and second directions by controlling a fifth driving element that is coupled to the second mobile mass, the first mobile mass being coupled to the first driving element and the third driving element, the second mobile mass being coupled to the second driving element; and
detecting signals at variable frequencies due to external angular velocities causing movements of the first and second mobile masses in the first, second, and third directions, a central bridge is directly coupled between the first mobile mass and the second mobile mass.

17. The method of claim 16, wherein the central bridge is coupled to a substrate.

18. The method of claim 17, wherein the fifth driving element includes:
a first electrode in the substrate, the first electrode coupled to the first mobile mass; and
a second electrode in the substrate, the second electrode driving the second mobile mass.

19. The method of claim 17, wherein moving the first and second mobile masses in a third direction further includes:
controlling a sixth driving element in the substrate that is coupled to the first mobile mass.

20. The method of claim 19, wherein the central bridge comprises a first bar in the second direction and a second bar in the first direction.

* * * * *

UNITED STATES PATENT AND TRADEMARK OFFICE
CERTIFICATE OF CORRECTION

| | | |
|---|---|---|
| PATENT NO. | : 12,038,283 B2 | Page 1 of 1 |
| APPLICATION NO. | : 17/821724 | |
| DATED | : July 16, 2024 | |
| INVENTOR(S) | : Alessandro Tocchio et al. | |

It is certified that error appears in the above-identified patent and that said Letters Patent is hereby corrected as shown below:

In the Claims

<u>Column 14, Claim 11, Lines 1-2:</u>
"central bridge bride is coupled"
Should read:
--central bridge is coupled--.

Signed and Sealed this
Twenty-fourth Day of September, 2024

Katherine Kelly Vidal
*Director of the United States Patent and Trademark Office*